United States Patent [19]

Steiner

[11] Patent Number: 5,398,996
[45] Date of Patent: Mar. 21, 1995

[54] BLOW-MOLDED HEADREST ARMATURE ASSEMBLY

[75] Inventor: Thomas J. Steiner, Washington, Mich.

[73] Assignee: Ford Motor Company, Dearborn, Mich.

[21] Appl. No.: 928,380

[22] Filed: Aug. 12, 1992

[51] Int. Cl.⁶ .......................... B60N 2/48; A47C 7/38
[52] U.S. Cl. .................... 297/391; 248/118;
                                           248/118.3; 297/410
[58] Field of Search ............... 297/391, 410, 452, .1,
            297/452.14, 397, DIG. 2; 248/118, 118.3;
            264/516, 523, 545; 403/384, 388, 393

[56] References Cited

U.S. PATENT DOCUMENTS

| | | | |
|---|---|---|---|
| 3,537,750 | 11/1970 | Lohr | 297/397 |
| 3,706,472 | 12/1972 | Mertens | 297/391 X |
| 3,910,634 | 10/1975 | Morris . | |
| 4,385,783 | 5/1983 | Stephens . | |
| 4,607,744 | 9/1986 | Nemoto | 264/516 X |
| 4,671,570 | 6/1987 | Hockenberry et al. | 297/DIG. 2 X |
| 4,674,797 | 6/1987 | Tateyama . | |
| 4,693,515 | 9/1987 | Russo et al. | 297/391 |
| 4,693,516 | 9/1987 | Knecht . | |
| 4,721,316 | 1/1988 | Whiteside . | |
| 4,732,244 | 3/1988 | Ono . | |
| 4,779,929 | 10/1988 | Küchemann | 297/391 X |
| 4,805,962 | 2/1989 | Sacco et al. | 297/452.14 |
| 4,822,102 | 4/1989 | Duvenkamp | 297/410 X |
| 4,848,836 | 7/1989 | Masui . | |
| 5,199,765 | 4/1993 | Garmendia et al. | 297/391 |

FOREIGN PATENT DOCUMENTS

| | | | |
|---|---|---|---|
| 2208224 | 9/1973 | Germany | 297/391 |
| 2405775 | 1/1976 | Germany | 297/391 |
| 1592141 | 7/1977 | Germany . | |
| 3018927 | 12/1981 | Germany | 297/391 |
| 3407776 | 9/1985 | Germany | 297/391 |
| 59-118437 | 12/1982 | Japan . | |
| 2012570 | 12/1978 | United Kingdom . | |
| 2176098 | 12/1986 | United Kingdom . | |
| 2188541 | 10/1987 | United Kingdom . | |
| 2204234 | 11/1988 | United Kingdom | 297/391 |
| 2221153 | 1/1990 | United Kingdom . | |

Primary Examiner—John J. Calvert
Attorney, Agent, or Firm—Damian Porcari; Roger L. May

[57] ABSTRACT

An improved motor vehicle headrest structure is disclosed wherein individual support posts are securely attached to a plastic armature. The armature is formed separately from the support posts, which are subsequently attached by rivets or other suitable means, and includes a shroud about the end of each support post. A conventional foam-filled cover surrounds the armature assembly.

17 Claims, 3 Drawing Sheets

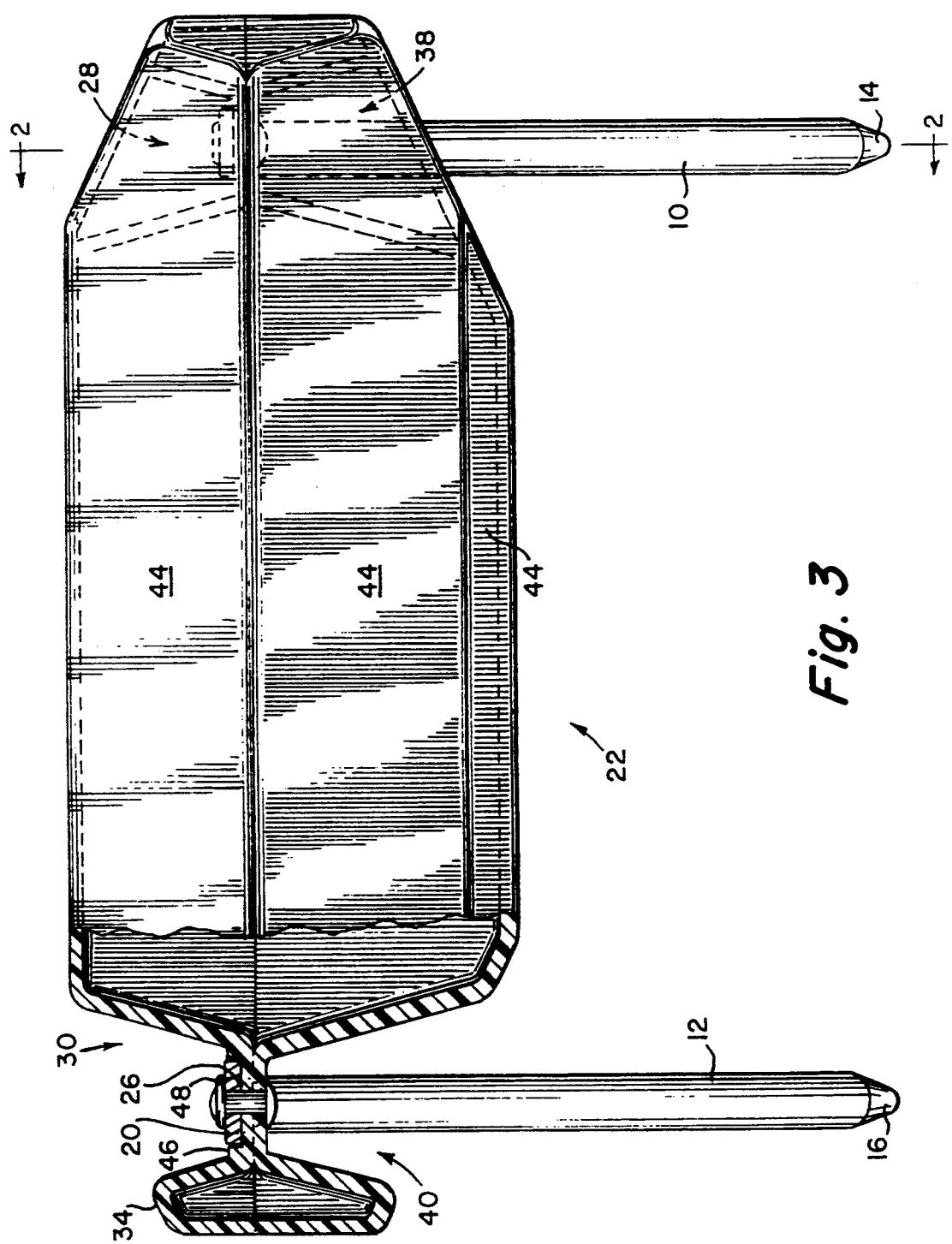

5,398,996

BLOW-MOLDED HEADREST ARMATURE ASSEMBLY

BACKGROUND OF THE INVENTION

1. Field Of The Invention

This invention relates to a motor vehicle headrest structure and, more particularly, to a motor vehicle headrest including an armature assembly comprising a plastic armature to which individual support posts are securely fastened.

2. Background Of The Invention

Headrests of various designs and construction are used in automobiles and other motor vehicles to protect passengers from injury in the event of an accident. Such headrests typically consist of a metal or plastic form, or armature, surrounded by suitable padding and a cover, supported by post means extending upwardly from the motor vehicle seat back. The armature provides a framework to support the padding and cover of the headrest assembly. Such headrests may be adjustable with respect to the seat back.

Previous motor vehicle headrests have utilized armatures made of metal or plastic, typically formed to provide, when covered with padding, a flat or convex finished surface adjacent the passenger's head. Typical post means used in motor vehicle headrests have included one piece inverted U-shaped posts and hollow metal tubes. Means for attaching the armature to the post means have included welding and insert molding of the armature to the post.

When the headrest armature is made from blow molded or injection molded plastic, the post means may be joined integrally to the armature by providing the post means as a mold insert. However, the use of mold inserts presents several potential disadvantages. The insertion of the post members into the mold during manufacture can be complicated and expensive.

In addition, the presence of metal insert elements in the molded part may also cause uneven cooling and dimensional distortion of the plastic armature. For example, U.S. Pat. No. 4,734,244 describes the problem of movement of the metal inserts within the plastic headrest armature during the post-molding cooling process. That patent discloses a mold and method to create internal structures in the headrest core to restrict movement of the metal insert during the cooling process. Such structures may make the molding process more complex and expensive.

Moreover, removal of flash or other excess material from the finished assembly may be more difficult because of the protruding metal insert. Finally, should one or more of the component pieces shift during the molding process, it may be difficult to rework, repair or salvage the assembly or its components.

Accordingly, a need has remained for an improved headrest armature design that may be produced reliably at reduced cost.

SUMMARY OF THE INVENTION

The present invention discloses several improvements over previous motor vehicle headrest structures. For example, certain preferred embodiments of the present invention employ rivets or other suitable fasteners to join the posts to the preformed armature, thereby avoiding the use of mold inserts and the problems associated with such use.

Another advantage of preferred embodiments of the present invention is a reduction in weight accomplished through the use of two individual posts instead of the single U-shaped post of the prior art.

Yet another advantage of certain preferred embodiments of the present invention is the use of solid metal posts with ends adapted to mate with matching surfaces provided by gussets angular indentations formed in the armature. Such construction promotes ease of assembly, facilitates proper alignment of the posts and permits convenient and effective fastening of the posts to the armature.

Still another advantage of preferred embodiments of the invention is provided by the shape of the armature. In addition to the natural strength properties of the armature's box shape, preferred armatures according to the present invention also include front and back gussets which enhance torsional rigidity. In combination with other structural elements, the gussets help reduce the shrinkage inherent in plastic blow molding processes. The gussets also help to ensure proper alignment of the support posts during assembly.

In certain embodiments, the armature may also include portions formed as a covering shroud over the top of the post. In addition, the armature may be formed such that the front surface of the finished headrest is slightly inwardly bowed, or concave, to increase comfort and restrain lateral movement of the head. Moreover, the displacement of the hollow armature reduces the volume of foam required in the finished headrest.

In one preferred embodiment, the invention includes two substantially straight support posts joined to a preformed armature having one or more gussets adapted to receive one end of each support post and to permit retention of the support posts in a fixed position relative to each other.

A preferred armature assembly of the present invention may advantageously be manufactured by blow molding a plastic armature having one or more attachment ports; fabricating a support post for each attachment port of the armature, each support post having a formed upper end with a surface adapted to contact flush with at least a portion of the attachment port of the armature; and attaching the formed end of one such support post to each attachment port of the armature by rivet or other suitable means.

Additional aspects of the present invention will be apparent from the following detailed description of certain preferred embodiments of the invention.

BRIEF DESCRIPTION OF THE DRAWING

FIG. 3 is a top sectional view of a preferred embodiment of the invention, taken through line 3—3 of FIG. 1.

DETAILED DESCRIPTION OF CERTAIN PREFERRED EMBODIMENTS

Figure 1:
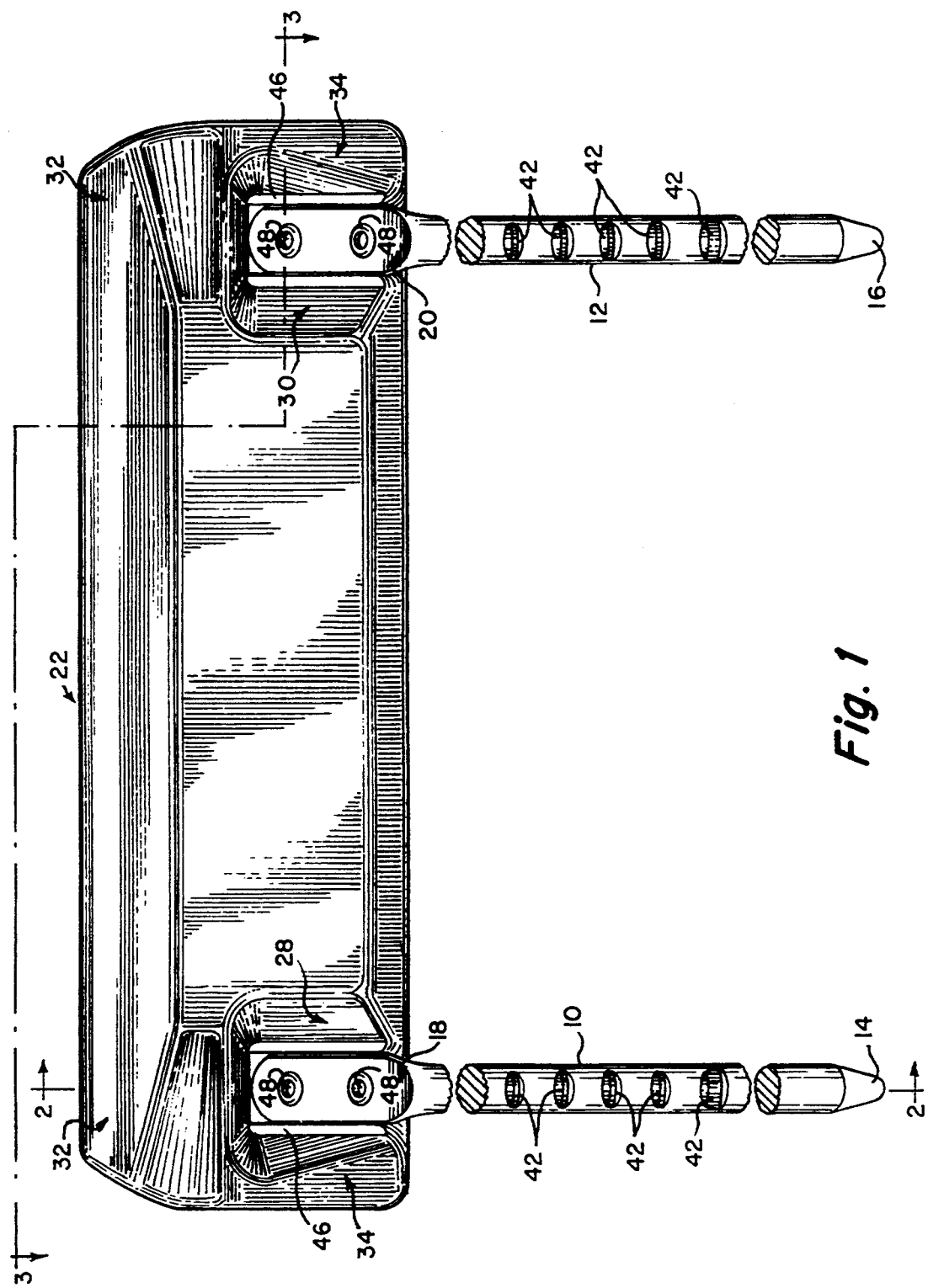
FIG. 1 is a rear elevation view of a preferred embodiment of the invention.

One preferred embodiment of the invention, shown in FIG. 1, includes two support posts 10, 12, each having a free end 14, 16 and a formed upper end 18, 20 attached to an armature 22. The support posts 10, 12 are advantageously formed from solid steel rods, but may be fabricated in any desired cross-sectional shape. Alternately, the support posts 10, 12 may be made of a suitable material other than steel, and may be hollow or solid. The free end 14, 16 of each support post 10, 12 may be tapered or otherwise adapted for convenience in mounting the finished headrest assembly to the motor vehicle seat back. The formed upper end 18, 20 of each support post 10, 12 is shaped, as hereafter described, to promote secure attachment to the armature 22.

A most preferred embodiment employs two identical support posts 10, 12, substantially straight throughout most of their length. The formed upper end 18, 20 of each support post 10, 12 is provided with a shaped, preferably flattened, surface 24, 26 (as shown in FIG. 2 and FIG. 3) for attachment to the armature 22.

In such a preferred embodiment, a plastic armature 22 is shaped to receive the formed upper end 18, 20 of each support post 10, 12 and to permit retention of the support posts in a fixed and essentially parallel position relative to each other. The armature 22 of the preferred embodiment may advantageously be made by blow molding high density polyethylene (HDPE), although other known suitable materials and manufacturing methods may also be successfully employed in the practice of the invention.

Figure 2:
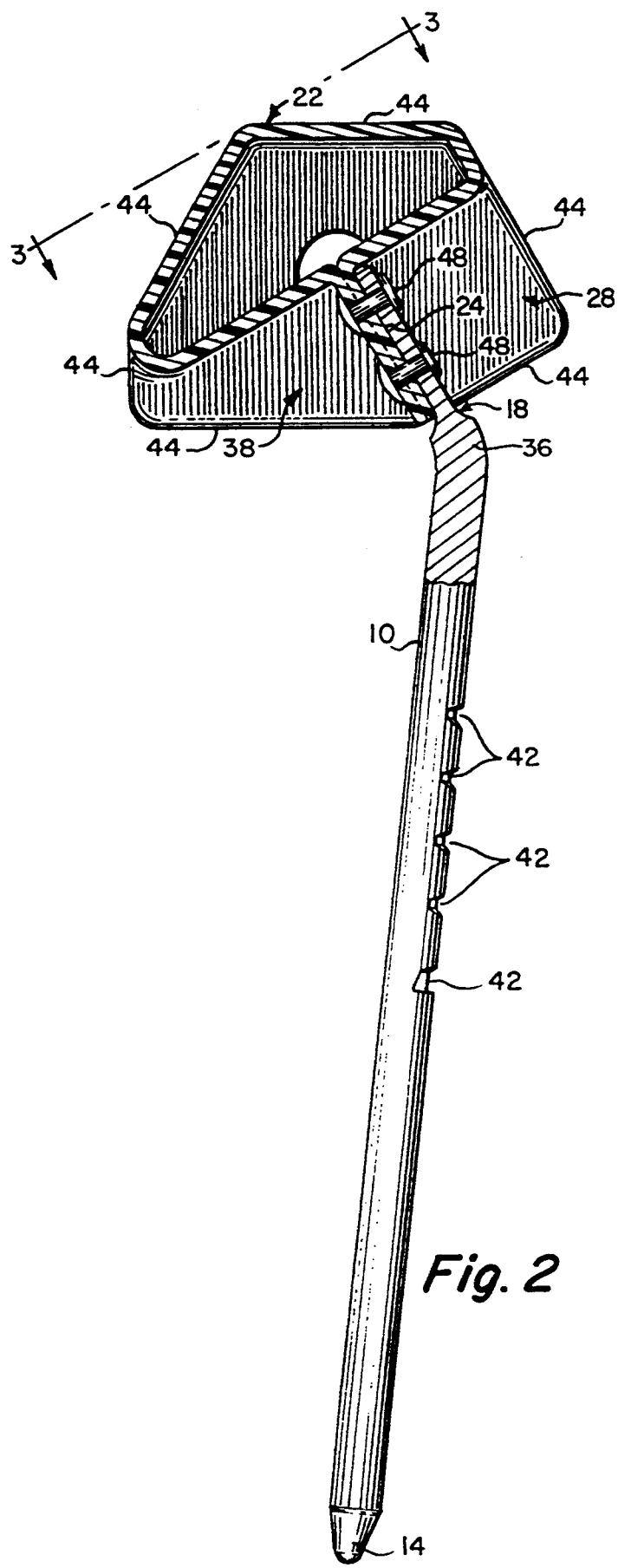
FIG. 2 is a side sectional view of the preferred embodiment of FIG. 1, taken through line 2—2 of FIG. 1.

Referring to FIGS. 1, 2 and 3, the armature 22 of such a preferred embodiment comprises essentially a polygonal box having formed therein at least one gusset 28, 30 at each support post attachment point with a surface formed to mate with the shaped surface 24, 26 of the support post 10, 12. The armature 22 further comprises portions formed above 32, and exterior to 34, the end of each support post 10, 12 to form a shroud over the end of the support posts.

Turning now to FIG. 2, it can be seen that each support post 10 may advantageously be provided with a curved portion 36, near the formed upper end 18 adjacent the armature 22, adapted to displace the armature forward, with respect to the seat back, of the plane defined by the straight portions of the support posts 10, 12. Each support post 10, 12 may also include a plurality of notches 42 or other means adapted to engage with a retaining mechanism within the seat back to permit adjustment of the height of the headrest with respect to the seat back.

The armature 22 is formed substantially as a hollow box of round, oval or polygonal cross section. The respective lengths of the several sides 44 of the polygonal cross-section need not be regular, and may be selected to impart a desired shape to the headrest when finished with foam padding and a cover. A preferred, irregular hexagonal cross-section is shown in FIG. 2. Similarly, as illustrated in FIG. 1 and FIG. 3, the ends 32, 34 of the armature 22 may be tapered or otherwise shaped to impart a desired shape to the finished headrest.

Referring still to FIG. 1 and FIG. 3, the armature 22 is advantageously provided with back gussets 28, 30 and front gussets 38, 40 formed so as to create an attachment port 46, most preferably planar, adapted to contact flush with at least a portion of the shaped surface 24, 26 of the support posts 10, 12. If the formed upper ends 18, 20 of the support posts 10, 12 are provided with other than a flattened surface, the back gussets 28, 30 and front gussets 38, 40 may be fabricated with a complementary shape adapted to align the support posts 10, 12 in the desired orientation and to permit secure fastening of the support posts 10, 12 to the armature 22.

Returning to FIG. 1, the attachment port 46 of each pair of gussets 28, 30 is provided with one or more, preferably two, holes (not shown), corresponding to similar holes 48 in the shaped surface 24, 26 of the formed upper end 18, 20 of each support post 10, 12, through which the support posts 10, 12 may be fastened to the armature 22 by rivets or other suitable fastening means. As shown in FIG. 1 and FIG. 2, each support post 10, 12 is preferably fastened to the side rearward, with respect to the seat back, of the attachment port 46.

It may be seen from the foregoing description of the invention that alterations may be made to the described embodiments without departing from the character of the invention. Accordingly, the following claims are intended to set forth and describe that which is regarded as the invention.

What is claimed is:

1. An armature assembly for use in a motor vehicle headrest comprising two substantially straight support posts joined to a preformed hollow elongated armature having angular indentations formed therein for receiving one end of each support post and to permit retention of the support posts in a fixed position relative to each other.

2. The armature assembly of claim 1 in which the support posts are solid steel.

3. The armature assembly of claim 1 in which the support posts are parallel to each other.

4. The armature assembly of claim 1 in which the armature is formed to provide a shroud about the end of each support post.

5. A motor vehicle headrest comprising the armature assembly of claim 1, a suitable amount of foam disposed around the armature, and a cover.

6. The armature assembly of claim 1 in which the support posts include a curved portion adjacent the armature.

7. The armature assembly of claim 1 in which the support posts have multiple notches to permit adjustment of the height of the headrest with respect to a motor vehicle seat back.

8. The armature assembly of claim 1 in which one end of each support post is provided with a substantially flattened surface adjacent the armature.

9. The armature assembly of claim 1 in which the armature is made of blow molded plastic.

10. The armature assembly of claim 1 in which each support post has a formed upper end, and the armature is provided with at least two attachment ports, each having a surface shaped to contact flush to at least a portion of the formed upper end of each support post.

11. The armature assembly of claim 10 in which the armature is provided with front and back angular indentations formed therein at each attachment port.

12. The armature assembly of claim 1 in which the support posts are joined to the armature by one or more rivets.

13. The armature assembly of claim 1 in which each support post is joined to the armature by at least two rivets.

14. An armature assembly for use in a motor vehicle headrest comprising:
two substantially straight support posts, wherein a formed upper end of each support post has a substantially flattened surface adjacent the armature; and,
a blow molded hollow elongated plastic armature, preformed with attachment ports comprising paired angular indentations formed therein each said attachment port being adapted to receive one end of one of said support posts to permit retention of the support posts in a fixed position relative to each other and, a fastener extending through each of said support posts and said attachment ports and firmly securing said support posts to said attachment ports.

15. An armature assembly for a headrest comprising two steel support posts joined to a plastic armature having one or more attachment ports, wherein:

each of said support posts has a formed upper end;

said armature, comprising essentially a hollow elongated box, forms a shroud about the formed upper end of each said support post;

said armature further includes at least one angular indentation formed therein at each attachment port with a surface formed to mate with a corresponding surface of the formed upper end of a corresponding one of said support posts;

each attachment port is shaped to receive the formed upper end of the corresponding one of said support posts such that the support posts are retained in a fixed and essentially parallel position relative to each other; and, each of said support posts, being essentially straight along most of its length, has a curved portion near said formed upper end adjacent the armature.

16. A motor vehicle headrest comprising the armature assembly of claim 15, a suitable amount of foam disposed around the armature, and a cover.

17. A method for manufacturing an armature assembly for use in a motor vehicle headrest, comprising the steps of:

forming by blow molding a hollow elongated plastic armature, comprising essentially a box having a front surface which is slightly concave, the box forming a plastic armature having angular attachment ports;

fabricating a support post for each attachment port of said armature, each support post having a formed upper end with a surface for flush contact with at least a portion of the attachment port of said armature; and, attaching the formed end of one such support post to each attachment port of the armature by rivet or other suitable means.

* * * * *